US010000003B2

(12) United States Patent
Bergmann et al.

(10) Patent No.: US 10,000,003 B2
(45) Date of Patent: Jun. 19, 2018

(54) METHOD FOR PRODUCING A CONTAINER FROM A THERMOPLASTIC

(71) Applicant: Kautex Textron GmbH & Co. KG, Bonn (DE)

(72) Inventors: Guido Bergmann, St. Augustin (DE); Carsten Elsasser, Pulheim (DE); Cristoph Mehren, Konigswinter (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 371 days.

(21) Appl. No.: 14/437,961

(22) PCT Filed: Mar. 12, 2013

(86) PCT No.: PCT/EP2013/000719
§ 371 (c)(1),
(2) Date: Apr. 23, 2015

(87) PCT Pub. No.: WO2014/063759
PCT Pub. Date: May 1, 2014

(65) Prior Publication Data
US 2015/0290863 A1  Oct. 15, 2015

(30) Foreign Application Priority Data
Oct. 25, 2012  (DE) .................. 10 2012 020 949

(51) Int. Cl.
*B65B 7/00* (2006.01)
*B29C 51/16* (2006.01)
(Continued)

(52) U.S. Cl.
CPC .............. *B29C 49/08* (2013.01); *B29C 49/04* (2013.01); *B29C 49/20* (2013.01);
(Continued)

(58) Field of Classification Search
CPC ............ B29C 49/20; B29C 2049/2017; B29C 2049/2021; B29C 2049/2026;
(Continued)

(56) References Cited

U.S. PATENT DOCUMENTS 4,342,799 A  8/1982  Schwochert
6,071,370 A  6/2000  Stiles
(Continued)

FOREIGN PATENT DOCUMENTS

CN  2808523 Y  8/2006
WO  2007090453 A2  8/2007
WO  2008003387 A1  1/2008

OTHER PUBLICATIONS

English language PCT Search Report dated Jul. 16, 2013, received in corresponding PCT Application No. PCT/EP13/00719, 2 pgs.
(Continued)

*Primary Examiner* — Philip C Tucker
*Assistant Examiner* — Brian R Slawski
(74) *Attorney, Agent, or Firm* — Grossman, Tucker, Perreault & Pfleger, PLLC (57) ABSTRACT

The invention relates to a method for producing a container (2) from a thermoplastic, having at least one surround (4), provided in the container wall (1), for a container opening. The surround (4) comprises a structure behind which parts of the container wall (1) extend and/or which is penetrated by said parts. The method is carried out using a multi-part blow mold that has at least two mold parts, each having at least one cavity, wherein the surround is placed as an insert in the cavity (10) of the blow mold (7). The method comprises pressing the preform that has been forced into the cavity (10) into the structure of the surround (4) by means of a tool which is brought to bear on the preform (12) on the side of the preform facing away from the cavity (10).

18 Claims, 5 Drawing Sheets (51) Int. Cl.
*B29C 47/00* (2006.01)
*B29C 65/00* (2006.01)
*B32B 37/00* (2006.01)
*C08J 5/00* (2006.01)
*B29C 45/14* (2006.01)
*B29C 43/00* (2006.01)
*B29C 49/08* (2006.01)
*B29C 49/04* (2006.01)
*B29C 49/20* (2006.01)
*B29C 49/48* (2006.01)
B29C 49/22 (2006.01)
B29L 31/00 (2006.01)
B29D 22/00 (2006.01)
B29K 101/12 (2006.01)

(52) U.S. Cl.
CPC .......... *B29C 49/4802* (2013.01); *B29C 49/22* (2013.01); *B29C 2049/2017* (2013.01); *B29D 22/003* (2013.01); *B29K 2101/12* (2013.01); *B29L 2031/7158* (2013.01); *B29L 2031/7172* (2013.01)

(58) Field of Classification Search
CPC .... B29C 2049/2047; B29C 2049/2065; B29C 51/267; B29C 51/12; B29C 65/02; B29C 65/028; B29C 66/61; B29C 66/612; B29L 2031/7172; B60K 15/03177; B60K 2015/03453; B60K 2015/0346; B60K 2015/03032

USPC ... 156/60, 69, 160, 163, 196, 197, 212, 221, 156/229, 242, 245, 250, 252, 253, 285, 156/286, 292, 308.2, 309.6; 264/515, 264/516, 545, 250, 260, 271.1, 273, 274, 264/275; 220/4.13, 4.14, 562; 425/116, 425/117, 121, 522

See application file for complete search history.

(56) References Cited

U.S. PATENT DOCUMENTS

| | | |
|---|---|---|
| 8,147,232 B2 | 4/2012 | Borchert et al. |
| 9,352,506 B2 | 5/2016 | Borchert et al. |
| 2008/0078761 A1* | 4/2008 | Borchert ................ B29C 49/20 220/4.13 |
| 2008/0210692 A1 | 9/2008 | Fujita |
| 2009/0045542 A1 | 2/2009 | Borchert et al. |
| 2009/0242551 A1 | 10/2009 | Matayoshi et al. |
| 2013/0277373 A1 | 10/2013 | Borchert et al. |

OTHER PUBLICATIONS

English language PCT Written Opinion dated Jul. 16, 2013, received in corresponding PCT Application No. PCT/EP13/00719, 3 pgs.

* cited by examiner

METHOD FOR PRODUCING A CONTAINER FROM A THERMOPLASTIC

The invention relates to a method for producing a container from a thermoplastic, having at least one surround, provided in the container wall, for a container opening.

The invention relates, in particular, to a method for producing a fixed container from a thermoplastic, e.g. as a fuel tank, screen wash tank or oil tank for a motor vehicle. Fuel tanks and the abovementioned service fluid tanks for motor vehicles are often provided with filling openings or inspection openings which have a metal surround, e.g. in the form of a bayonet ring or of a flange ring. This metal surround is molded in during the production of the container, such that a collar of the surround is completely embedded in the thermoplastic of the container wall. For this purpose, the surround comprises a structure, in the form of a perforated ring for example, which is penetrated by the thermoplastic of the container wall.

Integrally molded plastic collars or plastic bayonets on containers are not usually suitable for accepting corresponding closure systems, especially if the containers are produced on the basis of polyethylene, more particularly because of the tendency of polyethylene to creep when subject to the action of a corresponding force.

In the production of containers by extrusion blow molding, such surrounds are placed in the mold as an insert. After the closure of the mold, a correspondingly high blowing pressure must be applied to ensure that the warm and plastic material of the preform that has expanded in the mold penetrates or passes through the surround in such a way that the surround is securely enclosed by the wall of the finished container.

Because of the viscosity of the warm and plastic compound, such a production method requires not only the application of a relatively high blowing pressure in an early phase of the production cycle but also the maintenance of the blowing pressure for a certain time to ensure that the plastic can be blown around the surround or the insert without leaving any gaps.

If the hollow body is produced in a method in which a number of preforms in the form of webs are molded to give semifinished products in the form of shells, pre-blowing at an appropriate pressure and for an appropriate holding time is required before the shells are joined together to enable the surround to be intimately connected to the container wall.

This process is relatively time-consuming in relation to a production cycle.

It is therefore the underlying object of the invention to provide a method for producing a container from a thermoplastic of the abovementioned type, which method is improved over the known methods in respect of the required cycle time for producing a container to be manufactured.

The object underlying the invention is achieved by a method for producing a container from a thermoplastic, having at least one surround, provided in the container wall, for a container opening, wherein the surround comprises a structure behind which parts of the container wall extend and/or which is penetrated by said parts, wherein the method is carried out using a multi-part blow mold that has at least two mold parts, each having at least one cavity, which form a mold hollow, wherein the method comprises the following steps:

placing and fixing the surround in a cavity of a mold part, provision of at least two warm and plastic preforms in the form of webs, arrangement of the preforms between the opened mold parts of the blow mold, pulling the preforms into the cavities, preferably by evacuating the cavities, and pressing a certain area of the preform that has been pulled into the cavity into the structure of the surround by means of a tool which is brought to bear on the preform on the side of the preform facing away from the cavity, wherein the pressing action is limited to the region of the preform which receives the surround.

The preforms in the form of webs in accordance with the invention can be provided either by cutting open a pre-extruded tube at diametrically opposite points or by extruding preforms in the form of webs from mutually spaced slot dies.

Co-extrudates of a thermoplastic with barrier layers for hydrocarbons are preferred as extrudates. However, it is also possible to process preforms in the form of webs consisting of single-layer extrudates within the scope of the invention. The preforms in the form of webs are preferably extruded on the basis of HDPE (high density polyethylene). 6-layer co-extrudates with HDPE as a base material and EVOH as a barrier material are suitable, for example.

The method according to the invention has the advantage that it is not necessary to "blow" the surround into the container wall, and therefore the preforms can be pulled into the cavities exclusively by subjecting the cavities to a vacuum. It is not necessary to close the mold parts of the blow mold against a central die for the purpose of pre-blowing. As a result, pre-blowing, holding under excess pressure and venting of the cavities are unnecessary, thus allowing the cycle time to be considerably reduced.

As an alternative, provision can be made not to dispense completely with pre-blowing but to bring about pre-molding of the preforms with only a reduced pre-blowing pressure, if appropriate while simultaneously evacuating the cavities, and a reduction in the cycle time is thereby likewise achieved.

Moreover, the distribution of material in the preforms can be chosen in such a way that there is a smaller excess of material in the region of the surround to be enclosed than would be required if the material had to flow through the structure of the surround under the action of an appropriate excess gas pressure. The quality of the sealing surfaces in the region of the surround embedded in the container wall is also increased.

In an advantageous variant of the method according to the invention, provision is made for the pressing in of the preform in the region of the surround to be accomplished by means of a mold ram, which has a pressing surface complementary to the surround. The mold ram can be in the form of a contour ring or the like, for example.

As an alternative, pressing in can be accomplished by means of a bell which is brought to bear on the preform around the surround and is then supplied with a gas under pressure.

By means of such a bell, it is possible to produce only a very limited pressure in a certain area in the region of the surround, the effect being that the excess pressure produced in the bell presses the warm and plastic material of the preform through the structure of the surround. Such a system is far less sluggish since only a spatially very limited area has to be put under pressure. Moreover, pressing in by means of a bell has almost no effect on the cycle time since pressing in can be performed with the mold open.

Moreover, the subsequent venting of the cavities via a complex venting system, which would otherwise be necessary, is eliminated both when using a mold ram for pressing in and when using a bell for pressing in.

In an advantageous and expedient embodiment of the method according to the invention, provision is made for the mold ram or the bell to be arranged on an internal fixture carrier and for the internal fixture carrier to be introduced between the opened mold parts of the opened blow mold.

The method according to the invention comprises the introduction of internal fixtures into the still warm and plastic wall of the preforms pulled into the cavities, on the side facing away from the cavity in each case, e.g. by welding and/or riveting.

By way of example, the preform can be pressed in in the region of the surround approximately simultaneously with the introduction of the internal fixtures into the preforms that have been pre-molded into half-shells.

Here, provision can be made, for example, for the mold ram or the bell to be moved in relation to the internal fixture carrier for the purpose of pressing in the preform or, as an alternative, provision can be made for at least one mold part of the blow mold to be moved relative to the internal fixture carrier for the purpose of pressing in the preform. This can take place simultaneously with the joining of internal fixtures using a closing movement of the blow mold.

It is expedient if the mold ram or the bell is moved pneumatically. As an alternative, they can be moved hydraulically or mechanically.

It is expedient if the surround is composed of a material which is not compatible with the preform. Said surround can be designed as a metal flange ring as part of a bayonet joint, for example.

In another advantageous variant of the method according to the invention, it is envisaged that, after the preforms have been pulled into the cavities of the mold parts, at least one internal fixture for the container is secured on at least one preform on the side thereof facing away from the cavity, and then the preforms are joined together to form a substantially closed hollow body by closing the mold parts against one another.

In a preferred embodiment, the method furthermore comprises the continuous extrusion of at least two sheet-like preforms in the form of webs in the direction of the force of gravity above the opened parts of the blow mold used.

Both the pulling in and shaping of the preforms in the cavities of the blow mold and the joining thereof to give a finished hollow body are preferably carried out while using the initial heat of the extrudate, i.e. while using the plasticization heat from the extrusion process.

The invention is explained below with reference to an illustrative embodiment which is shown in the drawings, in which:

Figure 1:
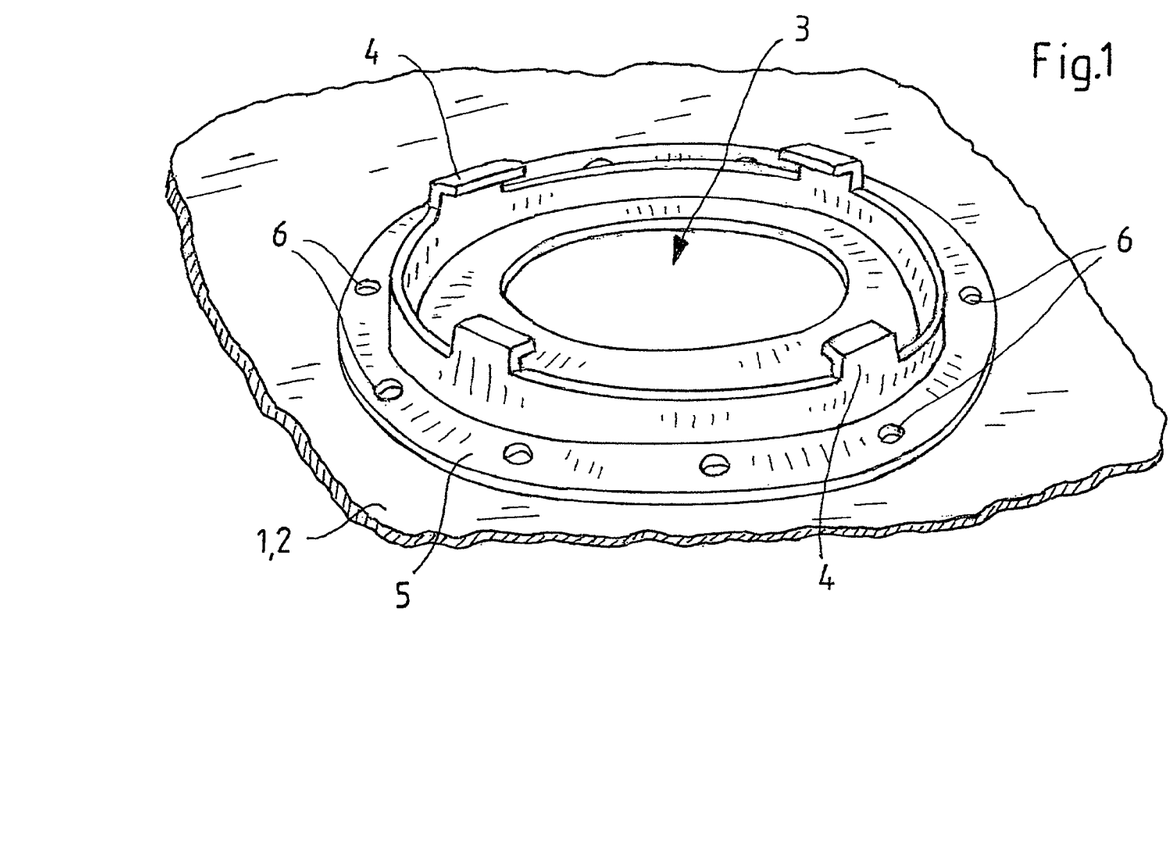
FIG. 1 shows a schematic representation of the wall of the container to be produced with the surround embedded in the wall.

Reference is made first of all to FIG. 1, which shows parts of a container wall 1 of a container 2 made of a thermoplastic in the region of an opening 3 in the container 2. The opening 3 can be designed as an inspection opening that can be sealed off with a cap, for example. The opening 3 comprises a metal surround 4, which is designed as a flange ring or bayonet ring. As an alternative, the surround 4 can be designed as a bushing for leads. The surround 4 is provided with a perforated rim 5, which is provided on the circumference thereof with a multiplicity of holes 6, which are penetrated by the thermoplastic material of the container wall 1. The container wall 1 is obtained from a single- or multi-layer extrudate based on HDPE, for example. The surround can be composed of steel or aluminum. The surround was molded into the container wall 1 during the production of the container 2, as described below, and the opening 3 was cut out or produced by circular machining after the removal of the container 2 from the mold.

The container 2 is produced using the blow mold 7 illustrated in FIGS. 2 to 5. The blow mold 7 comprises two mold parts 8, which are each secured on a mold clamping plate 9 and can be moved toward and away from one another in an opening and closing movement. The mold parts 8 each define a cavity 10, and the cavities 10 of the mold parts 8 define a mold hollow when the blow mold 7 is closed, the contour of said hollow corresponding approximately to the contour of the container 2 to be produced.

According to the illustrative embodiment shown in simplified form, the blow mold 7 furthermore comprises an internal fixture carrier 11, which can be introduced between the mold parts 8.

Figure 2A:
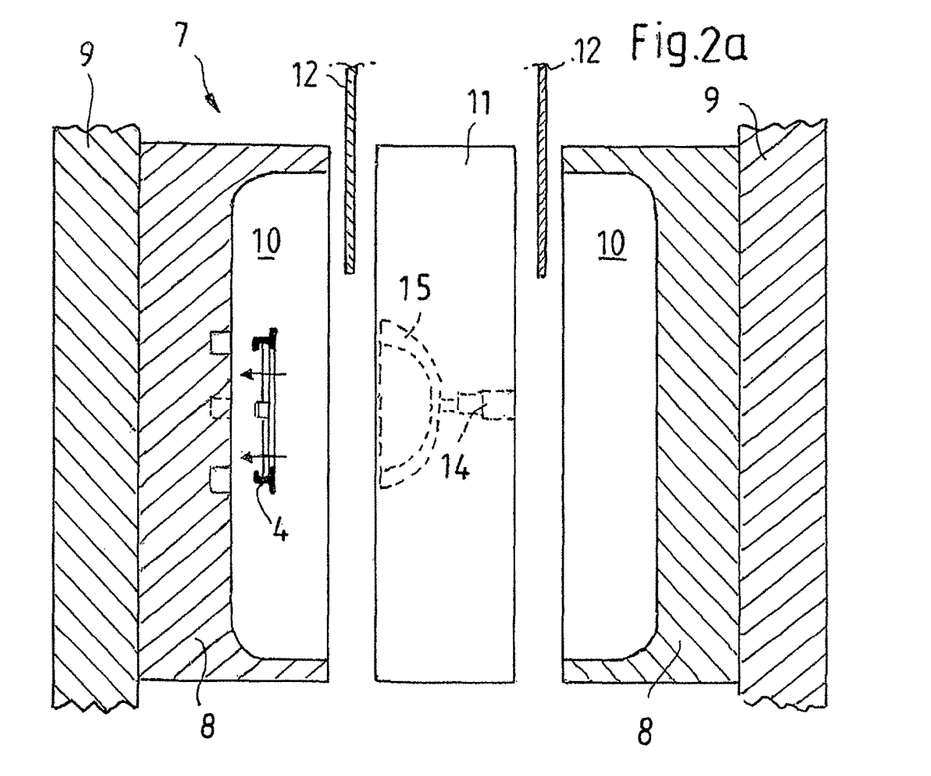
FIG. 2a shows a schematic representation of a blow mold according to the invention, illustrating the placement of the surround, wherein a bell is provided to press the preform in in the region of the surround.
Figure 3:
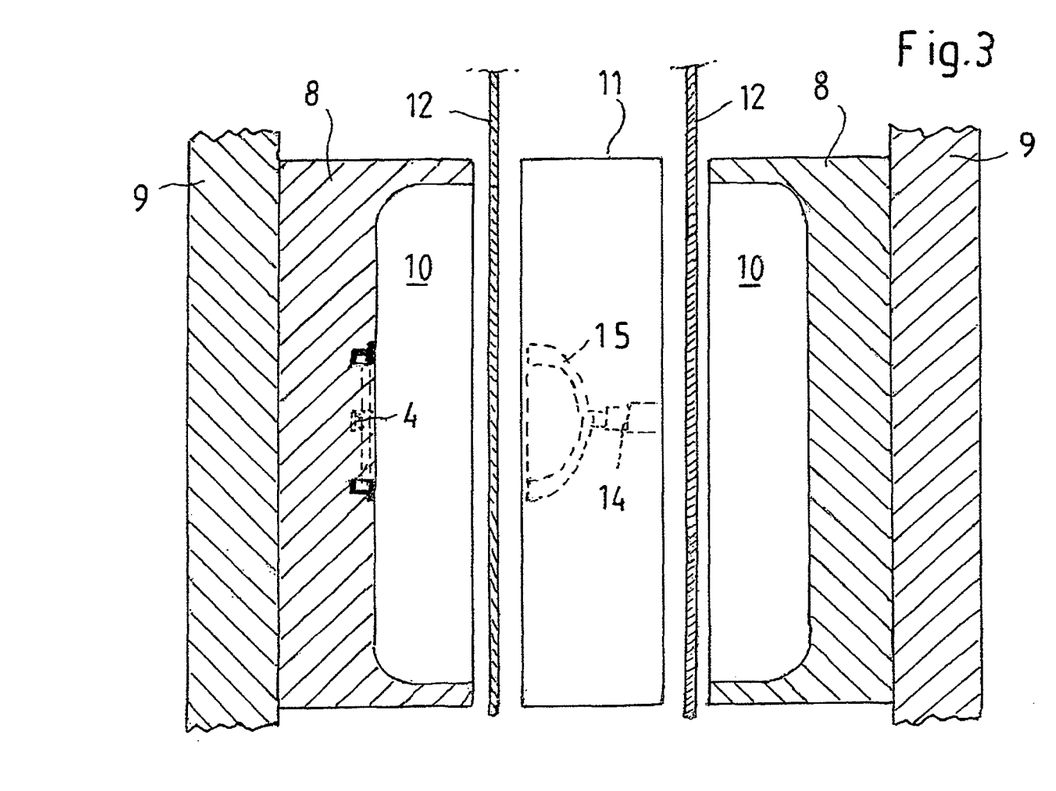
FIG. 3 shows a representation of the blow mold before the preforms are pulled into the cavities.

The method comprises extruding and/or providing two preforms 12 of thermoplastic material at the melting temperature, which are introduced between the mold parts 8, as can be seen from the sequence of FIGS. 2a and 3. The preforms are pulled into the cavities 10 by means of a vacuum and are shaped to give half-shells. The half-shells 13 are then provided with internal fixtures, if appropriate, and joined together to form a container.

Before the preforms 12 are pulled into the cavities 10 of the mold parts 8, the abovementioned surround 4 is inserted as an insert into at least one cavity 10. It is fixed in recesses 14 provided for this purpose in the cavity 10 concerned.

Figure 4:
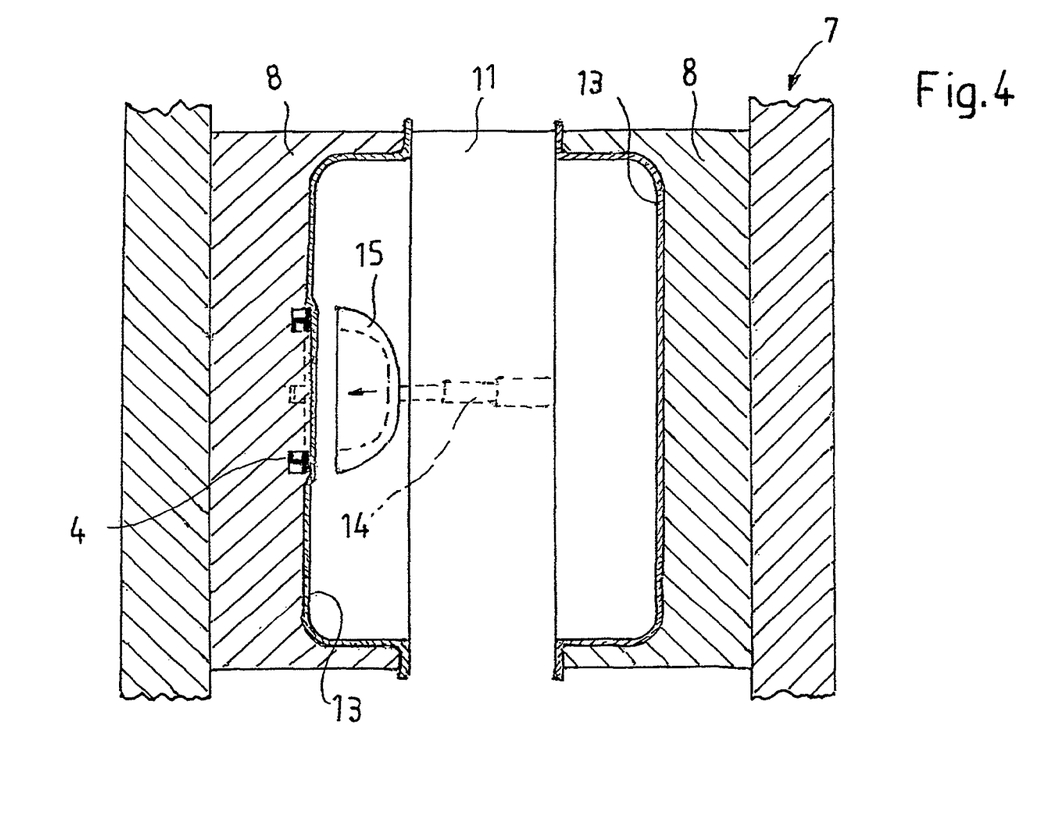
FIG. 4 shows a representation which illustrates the pressing in of the preforms pulled into the cavities.
Figure 5:
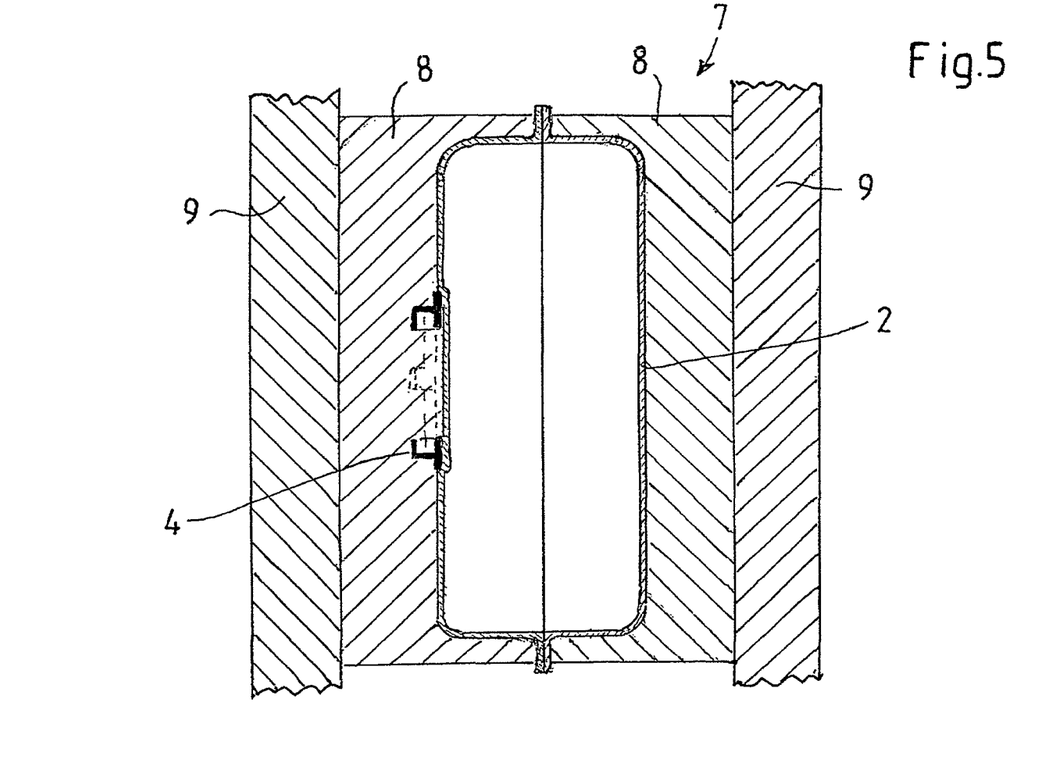
FIG. 5 shows a representation illustrating the joining together of the shell-shaped preforms to give a closed hollow body.

In the illustrative embodiments described, the preforms are extruded continuously in the direction of the force of gravity from an extrusion apparatus arranged above the blow mold 7. Once these have reached their full length (FIG. 3), the blow mold 7 is closed against the internal fixture carrier 11, and the cavities 10 are then evacuated, pulling the preforms 12 into the cavities 10, as illustrated in FIG. 4. Here, the internal fixture carrier 11 arranged between the mold parts 8 merely has the function of placing the preforms 12 against the mold parts 8 at the edges, ensuring that they cover the cavities 10 completely and thus allowing a vacuum applied via appropriate ducts in the mold parts 8 to take effect.

In a further method step, a bell 15 arranged on a pneumatic cylinder 14 is extended from the internal fixture carrier 11 and is brought to bear on the preform 12, which covers the surround 4. The bell 15 has a diameter which is only insignificantly greater than the diameter of the perforated rim 5 of the surround. The bell 15 is thus brought to bear under pressure and with a sealing action on that side of the preform which faces away from the cavity 10, and is then supplied with a pressurized gas (blowing air). The pressure within the bell 15 is maintained until the still warm and plastic material of the preform 12 has been pushed through the holes 6 in the perforated rim 5 of the surround 4, resulting in an intimate positive connection between the container wall 1 and the surround 4.

Figure 2B:
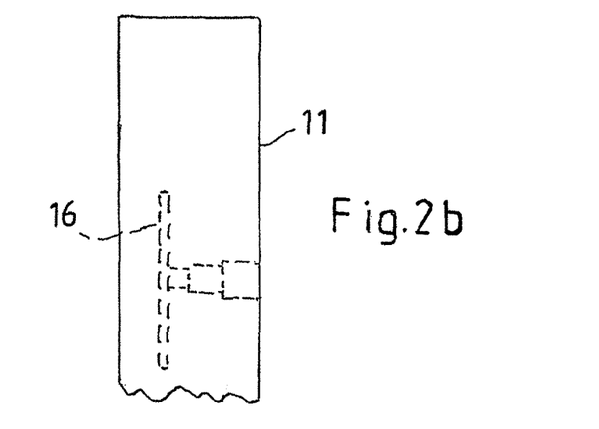
FIG. 2b shows a variant of the blow mold according to FIG. 2a, wherein a mold ram is provided to press the preform into the structure of the surround.

An alternative procedure is shown indicatively in FIG. 2*b*. Instead of a bell 15, a mold ram 16 is provided in the internal fixture carrier 11, being arranged on the internal fixture carrier 11 in such a way that it can be retracted and extended or adjusted in and out by means of a pneumatic cylinder 14. The mold ram 16 is provided with an end contour, e.g. a contour ring, which is of complementary design to the that side of the surround 4 which faces away from the cavity 10. By means of the mold ram 10, the preform 12 concerned is pressed into the surround 4 after the preforms 12 have been pulled into the cavities 10, such that the still warm and plastic material of the preform 12 penetrates the holes 6 in the perforated rim 5 of the surround. This process is completely mechanical, with the advantage that the distribution of the material between the mold ram 16 and the surround 4 can take place in a controlled and uniform manner without voids and folds. The internal fixture carrier 11 is then moved out of the path of movement of the mold parts 8, and the mold parts 8 are closed against one another, with the result that the half-shells 13 are joined together to give a closed container and can be welded at the edges.

In the method described, the internal fixture carrier 11 can, for example, additionally accommodate internal fixtures to be introduced into the container 2, which are joined to the preforms 12 by means of corresponding actuators/cylinders or the like. The internal fixtures can be connected materially and/or positively to the preforms 12, e.g. by welding or "in-situ riveting", in which the rivet material is pressed out of the preform 12 by means of the corresponding internal fixture, thus ensuring that the rivet concerned is formed integrally with the container wall 1 of the finished container.

As a departure from the method sequence illustrated, it is possible for the internal fixture carrier illustrated in the figures to be moved between the mold parts 8 only after the preforms 12 have already been pulled into the cavities 10. The preforms 12 can be pulled into the cavities 10 by means of a separate method step, for example, e.g. by means of a mold divider, as described in DE 10 2010 025 006 A1. The mold divider can be arranged with the internal fixture carrier 11 on a common machine frame, the mold divider or the internal fixture carrier 11 thus being introduced alternately between the mold parts 8.

As an alternative, the placement of the preforms 12 for the purpose of pulling them into the cavities can be accomplished by means of a separate placement aid.

LIST OF REFERENCE SIGNS

1 container wall
2 container
3 opening
4 surround
5 perforated rim
6 holes
7 blow mold
8 mold parts
9 mold clamping plate
10 cavity
11 internal fixture carrier
12 preforms
13 half-shells
14 pneumatic cylinder
15 bell
16 mold ram

What is claimed is:

1. A method for producing a container from a thermoplastic, having at least one surround, located on a wall of the container, for a container opening, wherein the surround comprises a structure behind which parts of the container wall extend and/or which is penetrated by the parts of the container wall, wherein the method is carried out using a multi-part blow mold that has at least two mold parts, each having at least one cavity, which form a mold hollow, wherein the method comprises:
    providing the surround in the cavity of one of the mold parts, wherein the surround comprises a flange ring,
    providing at least two heated thermoplastic preforms each in a form of a web,
    arranging the preforms between the mold parts of the multi-part blow mold,
    pulling each of the preforms into the cavity of one of the mold parts, respectively, and
    pressing the preform that has been pulled into the cavity of the mold part containing the at least one surround into the structure of the surround by a tool which is brought to bear on the preform on a side of the preform facing away from the cavity, wherein pressing of the preform is limited to a region of the preform which receives the surround.

2. The method as claimed in claim 1, wherein pressing of the preform in the region of the preform which receives the surround is accomplished with a mold ram, the mold ram having a pressing surface complementary to the surround.

3. The method as claimed in claim 2, wherein the mold ram is arranged on an internal fixture carrier and the internal fixture carrier is introduced between the mold parts of the multi-part blow mold.

4. The method as claimed in claim 3, wherein pressing the preform into the structure of the surround is accomplished with the mold ram moving relative to the internal fixture carrier.

5. The method as claimed in claim 3, wherein pressing the preform into the structure of the surround is accomplished with at least one mold part of the multi-part blow mold moving relative to the internal fixture carrier.

6. The method as claimed in claim 2, wherein the mold ram is moveable pneumatically.

7. The method as claimed in claim 1, wherein pressing of the preform in the region of the preform which receives the surround is accomplished with a bell brought to bear on the preform around the surround and is then supplied with a gas under pressure.

8. The method as claimed in claim 7, wherein the bell is arranged on an internal fixture carrier and the internal fixture carrier is introduced between the mold parts of the blow mold.

9. The method as claimed in claim 8, wherein pressing the preform into the structure of the surround is accomplished with the bell moving relative to the internal fixture carrier.

10. The method as claimed in claim 8, wherein pressing the preform into the structure of the surround is accomplished with at least one mold part of the multi-part blow mold moving relative to the internal fixture carrier.

11. The method as claimed in claim 7, wherein the bell is moveable pneumatically.

12. The method as claimed in claim 1, wherein the surround is composed of a material which is not compatible with the preforms.

13. The method as claimed in claim 1, wherein, after each of the preforms have been pulled into the cavity of one of the mold parts, at least one internal fixture for the container is secured on at least one of the preforms on a side facing away from the cavity, and then the preforms are joined together to form a substantially closed hollow body by closing the mold parts against one another.

14. The method as claimed in claim 1, wherein pulling each of the preforms into the cavity of one of the mold parts, respectively, is performed exclusively by providing a vacuum between each preform and the cavity of the mold part.

15. The method as claimed in claim 1, further comprising fixing the surround in the cavity of one of the mold parts.

16. The method as claimed in claim 1, further comprising placing the surround in a recess in the cavity of one of the mold parts.

17. The method as claimed in claim 1, wherein the flange ring is formed of metal and part of a bayonet joint.

18. The method as claimed in claim 1, wherein the surround comprises at least one hole, and pressing the preform into the structure of the surround comprises pressing the preform at least partially into the hole of the surround.

* * * * *